United States Patent
Lin (10) Patent No.: US 11,800,546 B2
(45) Date of Patent: Oct. 24, 2023

(54) METHOD AND APPARATUS FOR DETERMINING NUMBER OF UPLINK CONTROL INFORMATION TRANSMISSION RESOURCES, AND PROGRAM

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/200,472

(22) Filed: Mar. 12, 2021

(65) Prior Publication Data
US 2021/0204296 A1    Jul. 1, 2021

Related U.S. Application Data

(63) Continuation of application No. PCT/CN2018/106326, filed on Sep. 18, 2018.

(51) Int. Cl.
*H04W 72/04* (2023.01)
*H04W 72/10* (2009.01)
(Continued)

(52) U.S. Cl.
CPC ....... *H04W 72/53* (2023.01); *H04W 72/0446* (2013.01); *H04W 72/0453* (2013.01); *H04W 72/21* (2023.01); *H04W 72/56* (2023.01)

(58) Field of Classification Search
CPC . H04W 72/56; H04W 72/21; H04W 72/0446; H04W 72/53; H04W 72/0453;
(Continued)

(56) References Cited

U.S. PATENT DOCUMENTS

2016/0278074 A1    9/2016   Yang et al.
2019/0069303 A1*   2/2019   Yerramalli ............ H04W 72/21
(Continued)

FOREIGN PATENT DOCUMENTS

CN    102104467 A    6/2011
CN    105338652 A    2/2016
(Continued)

OTHER PUBLICATIONS

Guangdong OPPO Mobile Telecommunications Corp., Ltd., International Search Report and Written Opinion, PCT/CN2018/106326, dated May 31, 2019, 14 pgs.
(Continued)

*Primary Examiner* — Brian D Nguyen
(74) *Attorney, Agent, or Firm* — Morgan, Lewis & Bockius LLP (57) ABSTRACT

Disclosed are a method and apparatus for determining the number of uplink control information transmission resources, and a program. The method may comprise: a terminal device determining target uplink control information; and the terminal device determining, according to a preset rule or indication information sent by a network device, the number of resource for transmitting the target uplink control information. By applying the solution of the application, system performance, etc. can be improved.

12 Claims, 4 Drawing Sheets

(51) Int. Cl.
*H04W 72/53* (2023.01)
*H04W 72/0446* (2023.01)
*H04W 72/0453* (2023.01)
*H04W 72/21* (2023.01)
*H04W 72/56* (2023.01)

(58) Field of Classification Search
CPC ............. H04W 74/0808; H04L 5/0053; H04L 27/0006
See application file for complete search history.

(56) References Cited

U.S. PATENT DOCUMENTS

| | | | | |
|---|---|---|---|---|
| 2019/0159251 A1* | 5/2019 | Li | ............................. | H04L 1/18 |
| 2020/0107275 A1* | 4/2020 | Cho | .................... | H04W 52/362 |
| 2020/0351937 A1* | 11/2020 | Lee | ...................... | H04L 1/1822 |
| 2021/0321433 A1* | 10/2021 | Kim | ...................... | H04W 72/21 |

FOREIGN PATENT DOCUMENTS

| | | | |
|---|---|---|---|
| CN | 107210854 A | 9/2017 | |
| KR | 20180018247 A | 2/2018 | |
| SE | WO 2018/044219 A1 * | 3/2018 | ............. H04B 7/204 |
| WO | WO2020/056606 A1 | 3/2020 | |

OTHER PUBLICATIONS

Huawei, HiSilicon, "UCI transmission in NR operations in unlicensed," 3GPP TSG RAN WG1 Meeting #92bis, R1-1803682, Sanya, China, Apr. 16-Apr. 20, 2018, 6 pgs.

Guangdong OPPO Mobile Telecommunications Corp., Ltd., Extended European Search Report, EP18933976.5, dated Aug. 5, 2021, 10 pgs.

* cited by examiner

METHOD AND APPARATUS FOR DETERMINING NUMBER OF UPLINK CONTROL INFORMATION TRANSMISSION RESOURCES, AND PROGRAM

CROSS-REFERENCE TO RELATED APPLICATION

This application is a continuation application of PCT Application No. PCT/CN2018/106326, filed Sep. 18, 2018, the entire contents of which are incorporated herein by reference.

TECHNICAL FIELD

The application relates to wireless network technology and, particularly, to a method, an apparatus, and a program for determining the number of uplink control information transmission resource.

BACKGROUND

Unlicensed spectrum is the spectrum that can be divided by countries and regions for communication of radio equipment. This spectrum is generally considered as shared spectrum, that is, communication equipment in different communication systems can use this spectrum without necessity to apply for a proprietary spectrum license from the government, as long as they meet the regulatory requirements provided by the country or region on the spectrum.

In order to facilitate the coexistence of various communication systems that use unlicensed spectrum for wireless communications, some countries or regions have stipulated regulatory requirements that must be met when using unlicensed spectrum. For example, in some regions, communication equipment needs to follow the principle of LBT (Listen Before Talk), that is, the communication equipment needs to perform channel detection before sending signals on unlicensed spectrum channels. Only when the channel detection result indicates that the channel is idle, signal transmission can be performed. If the channel detection result indicates that the channel is busy, signal transmission cannot be performed.

With the development of wireless communication technology, both LTE (Long Term Evolution) system and NR (New Radio) system will consider deploying networks on unlicensed spectrum, so as to use unlicensed spectrum for data service transmission.

Before the communication equipment, such as a terminal device, sends a PUCCH (Physical Uplink Control Channel), it needs to perform channel detection. When the channel is idle, the PUCCH can be sent, otherwise it cannot be sent. When the UCI (Uplink Control Information), such as HARQ-ACK (Hybrid Automatic Repeat Request-ACK) is to be transmitted in the PUCCH, if the HARQ-ACK information in the PUCCH cannot be sent because of channel detection failure, the time delay and performance on the entire link will be greatly impacted, and there is currently no effective solution to this problem.

SUMMARY

In view of above, embodiments of the application provide a method, an apparatus, and a program for determining the number of uplink control information transmission resource, thereby improving the system performance.

According to a first aspect, there is provided a method for determining number of uplink control information transmission resource, including:

determining, by a terminal device, target uplink control information; and determining, by the terminal device according to a preset rule or according to indication information sent by a network device, the number of resource used for transmitting the target uplink control information.

According to a second aspect, there is provided a method for determining number of uplink control information transmission resource, including:

sending, by a network device, indication information to a terminal device, the indication information being used by the terminal device for determining the number of resource used for transmitting target uplink control information.

According to a third aspect, there is provided an apparatus for determining number of uplink control information transmission resource, configured to perform the method according to the first aspect as described above or any possible implementation manner thereof.

In some embodiments, the apparatus for determining number of uplink control information transmission resource includes a functional module configured to perform the method according to the first aspect as described above or any possible implementation manner thereof.

According to a fourth aspect, there is provided an apparatus for determining number of uplink control information transmission resource, configured to perform the method according to the second aspect as described above or any possible implementation manner thereof.

In some embodiments, the apparatus for determining number of uplink control information transmission resource includes a functional module configured to perform the method according to the second aspect as described above or any possible implementation manner thereof.

According to a fifth aspect, there is provided a communication device, including a processor and a memory, wherein the memory is configured to store a computer program, and the processor is configured to call and run the computer program stored in the memory, thereby implementing the method according to the first aspect as described above or any possible implementation manner thereof.

According to a sixth aspect, there is provided a chip configured to implement the method according to the first or second aspect as described above or any possible implementation manner thereof.

In some embodiments, the chip includes a processor, configured to call and run a computer program stored from a memory, thereby causing a device installed with the chip to perform the method according to the first or second aspect as described above or any possible implementation manner thereof.

According to a seventh aspect, there is provided a computer-readable storage medium, configured to store a computer program, wherein the computer program causes a computer to perform the method according to the first or second aspect as described above or any possible implementation manner thereof.

According to an eighth aspect, there is provided a computer program product, including computer program instructions which cause a computer to perform the method according to the first or second aspect as described above or any possible implementation manner thereof.

According to a ninth aspect, there is provided a computer program, when being executed on a computer, caucusing the computer to perform the method according to the first or second aspect as described above or any possible implementation manner thereof.

As can be seen from the above description, based on the solution of the application, after determining the target uplink control information, the terminal device can determine the number of resource used for transmitting the target uplink control information according to a preset rule or indication information sent by the network device. Therefore, the number of resource used for transmitting the target uplink control information can be different in different situations, and further, the transmission probability of the target uplink control information can be ensured with fewer resources, thereby improving the system performance.

DETAILED DESCRIPTION

The technical solution according to the embodiments of the application will be described below with reference to the drawings in the embodiments of the application. Obviously, the described embodiments are part of the embodiments of the application, but not all of the embodiments. Based on the embodiments in the application, all other embodiments obtained by a person of ordinary skill in the art without creative efforts shall fall within the protection scope of the application.

The embodiments of the application can be applied to various communication systems, for example, Global System of Mobile (GSM) communication system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (N R) system, NR evolution system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (Wi-Fi), next-generation communication system, or other communication systems.

Figure 1:
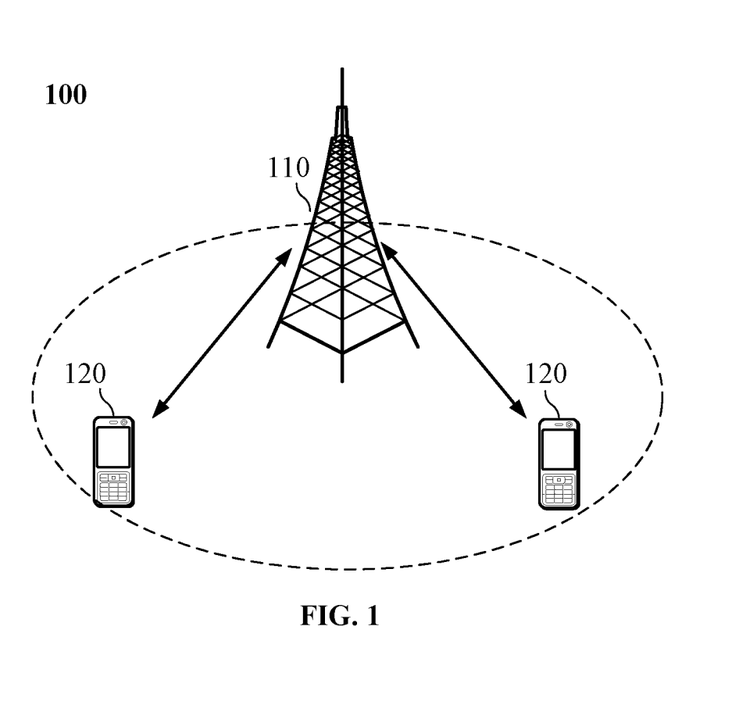
FIG. 1 is a schematic diagram illustrating a communication system architecture according to an embodiment of the application.

For example, FIG. 1 is a schematic diagram illustrating a communication system architecture according to an embodiment of the application. The communication system 100 may include a network device 110, and the network device 110 may be a device that communicates with a terminal device 120 (or a communication terminal or a terminal). The network device 110 may provide communication coverage for a specific geographic area, and may communicate with terminal devices located within the coverage area. In some embodiments, the network device 110 may be a base transceiver station (BTS) in the GSM system or CDMA system, or a NodeB (NB) in the WCDMA system, or an evolutional Node B (eNB or eNodeB) in the LTE system, or a wireless controller in the Cloud Radio Access Network (CRAN). Alternatively, the network device may be a mobile switching center, relay station, access point, vehicle equipment, wearable devices, hubs, switches, bridges, routers, network-side devices in NR networks, or network devices in future-evolved public land mobile networks (PLMN).

The communication system 100 further includes at least one terminal device 120 located within the coverage area of the network device 110. A connection to the terminal device used herein includes, but is not limited to, connection via wired lines, such as public switched telephone networks (PSTN), digital subscriber lines (DSL), digital cables, direct cable connections; and/or another data connection/network; and/or connection via a wireless interface, such as cellular networks, wireless local area networks (WLAN), digital television networks such as DVB-H networks, satellite networks, AM-FM broadcast transmitter; and/or another terminal device configured to receive/transmit communication signals; and/or an Internet of Things (IoT) device. A terminal device configured to communicate through the wireless interface may be referred to as a "wireless communication terminal", a "wireless terminal", or a "mobile terminal". Examples of mobile terminals include, but are not limited to, satellite or cellular phones; personal communication system (PCS) terminals that can combine cellular radiotelephones, data processing, facsimile, and data communications capabilities; PDA that can combine radiotelephones, pagers, Internet/Intranet access, Web browser, notepad, calendar, and/or Global Positioning System (GPS) receiver; and conventional laptop and/or palm-type receivers or other electronic devices including radiotelephone transceivers. The terminal device may refer to an access terminal, user equipment (UE), user unit, user station, mobile station, mobile site, remote station, remote terminal, mobile device, user terminal, terminal, wireless communication device, user agent, or user device. The access terminal can be a cellular phone, a cordless phone, a Session Initiation Protocol (SIP) phone, a Wireless Local Loop (WLL) station, a Personal Digital Processing (PDA), handheld devices with wireless communication function, computing devices, or other processing devices connected to a wireless modem, in-vehicle devices, wearable devices, terminal devices in an NR network, or terminal devices in a future evolved PLMN, and the like.

In some embodiments, D2D (Device to Device) communication can be performed between terminal devices 120.

The technical solutions of the embodiments of the application can be applied to unlicensed spectrum, and can also be applied to licensed spectrum, which is not limited in the embodiments of the application.

FIG. 1 exemplarily illustrates one network device and two terminal devices. In some embodiments, the communication system 100 may include multiple network devices and the coverage of each network device may include other numbers of terminal devices. The embodiments are not limited thereto.

In some embodiments, the communication system 100 may further include other network entities such as a network controller, a mobility management entity, and the like, the embodiments of the application are not limited thereto.

It should be understood that the device having a communication function in the network/system in the embodiments of the application may be referred to as a communication device. Taking the communication system 100 shown in FIG. 1 as an example, the communication device may include a network device 110 and a terminal device 120 having a communication function. The network device 110 and the terminal device 120 may be specific devices described above, and are not repeated herein. The communication device may also include other devices in the communication system 100, for example, other network entities such as a network controller, a mobile management entity, and the like, which is not limited in the embodiments of the application.

It should be understood that the terms "system" and "network" are often used interchangeably herein. The term "and/or" in this document is only a kind of association relationship describing related objects, which means that there can be three kinds of relationships, for example, A and/or B may refer to three cases: A exists alone, A and B exist simultaneously, or B exists alone. In addition, the character "/" in this article generally indicates that the related objects are in an "or" relationship.

In the unlicensed frequency band, it is necessary to determine whether to obtain the right to use the channel according to a channel access mode before performing signal transmission, such as performing channel detection on the channel. In some embodiments, the channel detection may also be considered as clear channel assessment (CCA) detection.

Channel access modes may have different priorities based on the priorities of different signals or service transmissions. As an example, the channel access mode may include no channel detection, single channel detection, and channel detection based on a contention window.

No channel detection means that the communication device can perform signal transmission without performing channel detection. For example, in the case of shared COT (Channel Occupancy Time) and the interval between two transmissions is less than a preset value (e.g., 16 us), the second transmission may be performed without channel detection.

Single channel detection refers to a situation where a communication device performs a channel detection of length T (e.g., 25 us) on an unlicensed carrier. If the channel is idle, the channel detection is considered successful. If the channel is occupied, the channel detection is considered failed. The single channel detection can also be called single slot channel detection. For example, the channel detection may be performed by collecting the signal energy on a channel in one time slot. If the energy value is greater than or equal to a preset threshold, the channel is considered to be occupied. If the energy value is less than the preset threshold, the channel is considered idle.

Channel detection based on the contention window means that a communication device generates a random number according to the contention window, and can perform data transmission only when the channel is detected to be idle within a time length corresponding to the generated random number according to a preset rule. In some embodiments, the channel detection based on the contention window may include the following steps.

In step S1, a counter value is set as $N=N_{init}$, where $N_{init}$ is a random number uniformly distributed between 0 and $CW_p$, and then step S4 is performed;

In step S2, if N is greater than zero, the counter value is decremented by 1, that is, N=N−1;

In step S3, the communication device performs CCA detection on the channel with a time length of $T_{sl}$ (for example, the length of $T_{sl}$ is 9 us, that is, a length of the CCA slot is 9 us). If the channel detection result is that the channel is idle, step S4 is performed; otherwise, step S5 is performed;

In step S4, if N is equal to zero, the channel access process ends; otherwise, step S2 is performed;

In step S5, the communication device performs CCA detection on the channel with a time length of $T_d$ (for example, $T_d=16+m_p*9$ (us)). When the result of the CCA detection is that at least one CCA slot is occupied, or that all CCA slots are idle;

In step S6, if the channel detection result is that all CCA time slots within the time period $T_d$ are idle, step S4 is performed; otherwise, step S5 is performed.

In an embodiment, $CW_p$ and $m_p$ can be determined according to the channel access priority p, that is, the channel detection based on the contention window can have different priorities. As an example, Table 1 gives examples of values of channel access parameters under different channel access priorities.

TABLE 1 values of channel access parameters under different channel access priorities

| Channel Access Priority (p) | $m_p$ | $CW_{min,p}$ | $CW_{max,p}$ | $T_{m\,cot,p}$ | Allowed Values of $CW_p$ |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms/ 10 ms | {15, 31, 63, 127, 255, 511, 1023} |
| 4 | 7 | 15 | 1023 | 6 ms/ 10 ms | {15, 31, 63, 127, 255, 511, 1023} |

Herein, $CW_{min,p}$ is a minimum value of $CW_p$ corresponding to channel access priority p, $CW_{max,p}$ is a maximum value of $CW_p$ corresponding to channel access priority p, $T_{mcot,p}$ is a maximum occupied length of the channel corresponding to the channel access priority p. The smaller the value of p, the higher the priority.

It should be understood that the channel access parameters shown in Table 1 are merely examples without limitation. The values corresponding to the channel access parameters may be adjusted according to actual conditions, or may only include some of the parameters. The embodiments of the application are not limited thereto.

It should be understood that when N is equal to zero, the channel access process is ended, the channel detection is successful, and the communication device obtains the right to use the channel. For example, the communication device can perform signal transmission on the channel.

In some embodiments, in the above channel access mode, the priorities of different channel access modes may be distinguished according to the success probability of preempting the channel. For example, if it is acceptable to perform no channel detection, the success probability of preempting the channel can be considered to be 100%, so the priority of not performing channel detection is higher than the priority of single channel detection.

For uplink control information transmission on an unlicensed carrier, multiple transmission resources can be configured for the uplink control information to increase the transmission probability of the uplink control information, thereby reducing the impact of transmission failure of the uplink control information due to failure of the channel detection. Because the channel access modes corresponding to the uplink control information transmission may be different in different situations, the priorities of different channel access modes are different, that is, the success probability of preempting channels is different under different channel access modes, so corresponding to different channel access modes, the number of resource used for transmitting uplink control information may be different.

Figure 2:
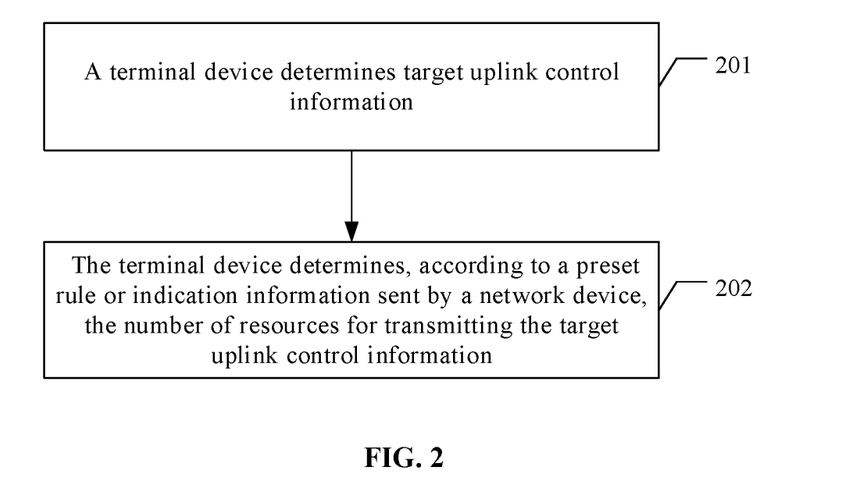
FIG. 2 is a schematic flowchart illustrating a method for determining number of uplink control information transmission resource according to an embodiment of the application.

FIG. 2 is a schematic flowchart illustrating a method for determining the number of uplink control information transmission resource according to an embodiment of the application. As shown in FIG. 2, the following specific implementation manners are included.

In 201, the terminal device determines target uplink control information.

In 202, the terminal device determines the number of resource used for transmitting the target uplink control information according to a preset rule or according to indication information sent by the network device.

In some embodiments, the terminal device determines the target uplink control information includes that the terminal device determines information content or information bit corresponding to the target uplink control information.

In some embodiments, the target uplink control information may include at least one of HARQ-ACK information, channel state information (CSI), or scheduling request (SR) information. The channel state information includes at least one of a rank indication (RI), a precoding matrix indicator (PMI), or a channel quality indicator (CQI).

In some embodiments, the terminal device may determine the number of resource used for transmitting the target uplink control information according to the preset rule or according to the indication information sent by the network device, where the resource used for transmitting the target uplink control information may include at least one of PUCCH resource or PUSCH (Physical Uplink Shared Channel) resource.

The manner in which the terminal device determines the number of resource used for transmitting the target uplink control information may be determined according to actual needs, including but not limited to the following manners.

1) First Manner

The number of resource used for transmitting the target uplink control information is determined according to a target channel access mode. The target channel access mode is a channel access mode corresponding to a resource used for transmitting target uplink control information. In some embodiments, the target channel access mode may be a channel access mode corresponding to the first one resource used for transmitting target uplink control information.

In some embodiments, when the terminal device determines the number of resource used for transmitting the target uplink control information according to the preset rule or the indication information sent by the network device, the preset rule or the indication information sent by the network device may be used for determining the number of resource used for transmitting the target uplink control information. Further optionally, when the preset rule or the indication information sent by the network device is used for determining the number of resource used for transmitting the target uplink control information, a channel access mode corresponding to the resource used for transmitting the target uplink control information is considered.

In some embodiments, when the terminal device determines the number of resource used for transmitting the target uplink control information according to the preset rule or the indication information sent by the network device, the preset rule or the indication information sent by the network device may be used for determining the number of resource used for transmitting the target uplink control information. Further optionally, the terminal device may determine a channel access mode corresponding to the resource used for transmitting the target uplink control information according to the determined number of resource used for transmitting the target uplink control information.

In some embodiments, in some embodiments of the application, the number of resource corresponding to a first channel access mode is N, the number of resource corresponding to a second channel access mode is M, and a priority of the first channel access mode is higher than a priority of the second channel access mode, where M and N are positive integers, and a value of M is greater than or equal to a value of N. For example, when the target channel access mode is the first channel access mode, the number of resource is N, and when the target channel access mode is the second channel access mode, the number of resource is M.

In an embodiment, the value of M is preset or determined according to the indication information sent by the network device, and/or the value of N is preset or determined according to the indication information sent by the network device. For example, the terminal device may determine the value of M and/or N according to a preset correspondence between the channel access modes and the numbers of resource, and may also determine the value of M and/or N according to the indication information sent by the network device.

The foregoing manner of determining the values of M and N is merely an example, and is not used to limit the technical solution of the application. For example, the value of M may be preset or determined according to the indication information sent by the network device, and the value of N may be determined according to M. Alternatively, the value of N may be preset or determined according to the indication information sent by the network device, and the value of M is determined according to N.

In some embodiments, when the terminal device determines the number of resource used for transmitting the target uplink control information according to a preset rule or indication information sent by the network device, it may include: the terminal device determines the target channel access mode according to the preset rule or the indication information sent by the network device, and determines the number of resource used for transmitting the target uplink control information according to the target channel access mode. The target channel access mode is a channel access mode corresponding to a resource used for transmitting the target uplink control information.

In some embodiments, in some embodiments of the application, the terminal device may first determine the target channel access mode according to the preset rule or the indication information sent by the network device, and then determine the number of resource used for transmitting the target uplink control information according to a preset correspondence between channel access modes and numbers of resource and based on the determined target channel access mode.

When the target channel access mode is the first channel access mode, the number of resource is N. When the target channel access mode is the second channel access mode, the number of resource is M. The priority of the first channel access mode is higher than the priority of the second channel access mode. Both M and N are positive integers, and the value of M is greater than or equal to the value of N.

In some embodiments, in some embodiments of the application, the target channel access mode may further correspond to a target parameter set, and the number of resource may be determined according to the target parameter set.

For example, when the target channel access mode is the first channel access mode, the target parameter set is the first parameter set, and when the target channel access mode is the second channel access mode, the target parameter set is the second parameter set. The priority of the first channel access mode is higher than the priority of the second channel access mode, and a maximum value in the first parameter set is smaller than a maximum value in the second parameter set.

The first parameter set may be preset or determined according to the indication information sent by the network device, and/or the second parameter set may be preset or determined according to the indication information sent by the network device. For example, the network device may configure a target parameter set for the terminal device through radio resource control (RRC) signaling, where different target parameter sets correspond to different channel access modes.

The terminal device can determine the number of resource from the target parameter set. Specifically, the terminal device may determine the number of resource from the target parameter set according to the indication information sent by the network device. For example, the network device may determine the number of resource from the target parameter set, and indicate the number of resource to the terminal device through dynamic signaling. Specifically, the dynamic signaling may be an explicit indication or an implicit indication.

In some embodiments, the priority of the first channel access mode being higher than the priority of the second channel access mode may include following examples. The first channel access mode is no channel detection, and the second channel access mode is a single channel detection. Alternatively, the first channel access mode is no channel detection, and the second channel access mode is channel detection based on the contention window. Alternatively, the first channel access mode is single channel detection, and the second channel access mode is channel detection based on the contention window. Alternatively, the first channel access mode is the channel access mode with higher priority in the channel detection based on the contention window, and the second channel access mode is the channel access mode with lower priority in the channel detection based on the contention window. For example, the priority corresponding to the first channel access mode is p=1, and the priority corresponding to the second channel access mode is p=2.

For example, the channel access mode corresponding to the resource used for transmitting the target uplink control information includes a channel access mode without channel detection and a channel access mode with a single channel detection. When the resource used for transmitting the target uplink control information can use the channel access mode without channel detection, the number of resource used for transmitting the target uplink control information is 1; when the resource used for transmitting the target uplink control information uses the channel access mode with the single channel detection, the number of resource used for transmitting the target uplink control information is 2. In an embodiment, the number of resource may be preset or indicated by the network device to the terminal device through the indication information.

For another example, the channel access mode corresponding to the resource used for transmitting the target uplink control information includes a channel access mode without channel detection and a channel access mode with a single channel detection. When the number of resource used for transmitting the target uplink control information is 1, the resource used for transmitting the target uplink control information can use the channel access mode without channel detection; when the number of resource used for transmitting the target uplink control information is 2, the resource used for transmitting the target uplink control information can use the channel access mode with single channel detection. In an embodiment, the number of resource may be preset or indicated by the network device to the terminal device through the indication information.

As another example, the channel access mode corresponding to the resource used for transmitting the target uplink control information includes a channel access mode with a single channel detection and a channel access mode with a channel detection based on a contention window, where a first parameter set corresponding the channel access mode with the single channel detection is {1,2}, a second parameter set corresponding to the channel access mode with the channel detection based on the contention window is {2,4}, and the first parameter set and the second parameter set are configured by the network device through RRC signaling. When the resource used for transmitting the target uplink control information uses the channel access mode with the single channel detection, the network device uses 1-bit dynamic signaling to indicate which one in the set of {1,2} is the number of resource used for transmitting the target uplink control information. When the resource used for transmitting the target uplink control information can use the channel access mode with the channel detection based on the contention window, the network device uses 1-bit dynamic signaling to indicate which one in the set of {2,4} is the number of resource used for transmitting the target uplink control information.

The specific form of each indication information involved in the above description is not limited. For example, it can be one signaling or multiple signaling, high-level signaling or physical layer signaling.

In some embodiments, in some embodiments of the application, the indication information sent by the network device may be physical layer signaling, and/or the indication information sent by the network device may be high-level signaling. For example, the indication information may be downlink control information (DCI) signaling, and/or, RRC signaling, and/or, media access control (MAC) signaling.

2) Second Manner

The number of resource may be determined according to a time domain position and/or a frequency domain position of the resource used for transmitting target uplink control information. In some embodiments, the number of resource may be determined according to a time domain position and/or a frequency domain position of the first one resource among resources for transmitting target uplink control information.

For example, when the resource used for transmitting the target uplink control information is located in a shared COT (for example, some resources of channel resources for which the network device obtains the channel usage right are used for the uplink control information transmission of the terminal device, or some resources of channel resources for which the terminal device obtains the channel usage right during its spontaneous transmission are used for uplink control information transmission), if a time interval between a time domain start position of the first resource among the resources used for transmitting the target uplink control information and a time domain end position of a downlink time unit sent by the network device is less than or equal to a first preset value, the number of resource for transmitting the target uplink control information is P; and/or, if the time interval between the time domain start position of the first resource among the resources used for transmitting the target uplink control information and the time domain end position of the downlink time unit sent by the network device is greater than the first preset value and less than or equal to a second preset value, the number of resource used for transmitting the target uplink control information is Q; and/or, if the time interval between the time domain start position of the first resource among the resources used for transmitting the target uplink control information and the time domain end position of the downlink time unit sent by the network device is greater than the second preset value, the number of resource used for transmitting uplink control information is Q. The value of P is less than or equal to Q, and the first preset value is less than the second preset value. By way of example without limitation, the first preset value is 16 microseconds, the second preset value is 25 microseconds, the value of P is 1, and the value of Q is 2.

3) Third Manner

The number of resource may be determined according to a time interval between a first downlink time unit and a first uplink time unit. In an embodiment, the first downlink time unit is the last downlink time unit corresponding to the target uplink control information, and the first uplink time unit is the first time unit available for the terminal device to perform uplink transmission after the first downlink time unit.

Figure 3:
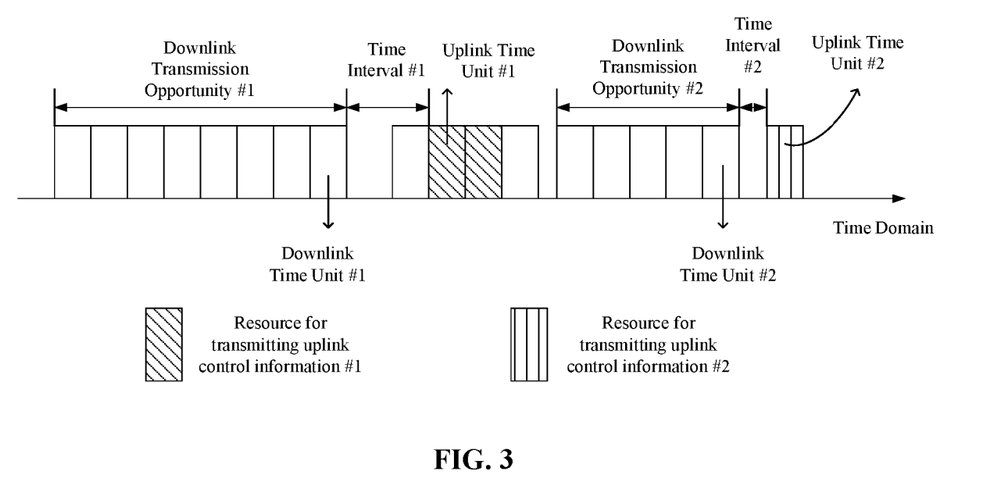
FIG. 3 is a schematic diagram of determining the number of resource based on a time interval between a first downlink time unit and a first uplink time unit according to an embodiment of the application.

FIG. 3 is a schematic diagram of determining the number of resource based on the time interval between the first downlink time unit and the first uplink time unit according to an embodiment of the application. As shown in FIG. 3, the uplink control information #1 includes HARQ-ACK information corresponding to PDSCH scheduled by the terminal device in a time unit included in a downlink transmission opportunity #1. Therefore, the first downlink time unit corresponding to the uplink control information #1 is the last downlink time unit in the downlink transmission opportunity #1, that is, the downlink time unit #1 in FIG. 1. After the downlink time unit #1, the first time unit that can be used for uplink transmission by the terminal device is the uplink time unit #1 shown in FIG. 1. The time interval #1 between the downlink time unit #1 and the uplink time unit #1 is greater than the preset value, so the resource for transmitting the uplink control information #1 includes two resources. In some embodiments, the two resources are located on the uplink time unit #1 and the latter one time unit of the uplink time unit #1.

The uplink control information #2 includes HARQ-ACK information corresponding to the PDSCH scheduled by the terminal device on the time unit included in the downlink transmission opportunity #2. Therefore, the first downlink time unit corresponding to the uplink control information #2 is the last downlink time unit in the downlink transmission opportunity #2, that is, the downlink time unit #2 in FIG. 1. After the downlink time unit #2, the first time unit available to the terminal device for uplink transmission is the uplink time unit #2 shown in FIG. 1. The time interval #2 between the downlink time unit #2 and the uplink time unit #2 is less than the preset value. Therefore, the resource used for transmitting the uplink control information #2 includes one resource. In some embodiments, the one resource is located on the uplink time unit #2.

It should be understood that, in the embodiments of the application, a time unit may refer to one or more subframes, or one or more time slots, or one or more micro time slots, or one or more symbols. The embodiments of the application are not limited thereto.

The above mainly describes the solution of the application from the terminal device side, and the following describes the solution of the application from the network device side.

For the network device, indication information may be sent to the terminal device, where the indication information is used by the terminal device to determine the number of resource used for transmitting the target uplink control information.

In some embodiments, the target uplink control information may include at least one of HARQ-ACK information, CSI information, or SR information. The CSI information may include at least one of RI information, PMI information, or CQI information. The resource used for transmitting the target uplink control information may include at least one of a PUCCH resource, a PUSCH resource, or the like.

In some embodiments, the number of resource may be determined according to a target channel access mode, and the target channel access mode is a channel access mode corresponding to the resource used for transmitting target uplink control information. In some embodiments, the target channel access mode may be a channel access mode corresponding to the first resource used for transmitting target uplink control information.

The network device may indicate, according to the target channel access mode of the terminal device, the number of resource used for transmitting the target uplink control information through the indication information.

In some embodiments, in some embodiments of the application, the number of resource corresponding to the first channel access mode is N, the number of resource corresponding to the second channel access mode is M, and the priority of the first channel access mode is higher than the priority of the second channel access mode. M and N are positive integers, and the value of M is greater than or equal to the value of N. For example, when the target channel access mode is the first channel access mode, the number of resource is N, and when the target channel access mode is the second channel access mode, the number of resource is M.

In some embodiments, the network device may send indication information to the terminal device, where the indication information is used by the terminal device to determine the value of M; and/or, the network device sends the indication information to the terminal device, and the indication information is used by the terminal device to determine the value of N. In other words, the value of M is determined according to the indication information sent by the network device, and/or the value of N is determined according to the indication information sent by the network device.

The network device may also indicate the target channel access mode to the terminal device, and then the terminal device determines the number of resource used for transmitting the target uplink control information based on the target channel access mode.

In some embodiments, when the target channel access mode is the first channel access mode, the number of resource is N, and when the target channel access mode is the second channel access mode, the number of resource is M, and the priority of the first channel access mode is higher than the priority of the second channel access mode. M and N are positive integers, and the value of M is greater than or equal to the value of N.

In some embodiments, in some embodiments of the application, the target channel access mode may also correspond to a target parameter set, and the number of resource may be determined according to the target parameter set.

For example, when the target channel access mode is the first channel access mode, the target parameter set is the first parameter set, and when the target channel access mode is the second channel access mode, the target parameter set is the second parameter set, The priority of the first channel access mode is higher than the priority of the second channel access mode, and the maximum value in the first parameter set is smaller than the maximum value in the second parameter set.

The network device may send indication information to the terminal device, where the indication information is used by the terminal device to determine the first parameter set; and/or, the network device sends indication information to the terminal device, and the indication information is used by the terminal device to determine the second parameter set. For example, the network device may configure a target parameter set for the terminal device through RRC signaling, where different target parameter sets correspond to different channel access modes.

The network device may also send indication information to the terminal device, instructing the terminal device to determine the number of resource from the target parameter set. For example, the network device may determine the number of resource from the target parameter set, and indicate the number of resource to the terminal device through dynamic signaling. Specifically, the dynamic signaling may be an explicit indication or an implicit indication.

In some embodiments, the priority of the first channel access mode being higher than the priority of the second channel access mode may include following examples. The first channel access mode is no channel detection, and the second channel access mode is a single channel detection. Alternatively, the first channel access mode is no channel detection, and the second channel access mode is the channel detection based on the contention window. Alternatively, the first channel access mode is the single channel detection, and the second channel access mode is the channel detection based on the contention window. Alternatively, the first channel access mode is the channel access mode with higher priority in the channel detection based on the contention window, and the second channel access mode is the channel access mode with lower priority in the channel detection based on the contention window. For example, the priority corresponding to the first channel access mode is p=1, and the priority corresponding to the second channel access mode is p=2.

The specific form of each indication information involved in the above description is not limited. For example, it may be one signaling or multiple signaling, high-level signaling, or physical layer signaling.

In some embodiments, in some embodiments of the application, the indication information sent by the network device may be physical layer signaling, and/or the indication information sent by the network device may be high-level signaling. For example, the indication information may be DCI signaling, and/or, RRC signaling, and/or, MAC signaling.

The number of resource may also be determined according to a time domain position and/or a frequency domain position of the resource used for transmitting target uplink control information. In some embodiments, the number of resource may be determined according to a time domain position and/or a frequency domain position of the first resource among resources used for transmitting target uplink control information.

For example, when the resource used for transmitting the target uplink control information is located in a shared COT (for example, some resources of channel resources for which the network device obtains the channel usage right are used for the uplink control information transmission of the terminal device, or some resources of channel resources for which the terminal device obtains the channel usage right during its spontaneous transmission are used for uplink control information transmission), if a time interval between a time domain start position of the first resource among the resources used for transmitting the target uplink control information and a time domain end position of a downlink time unit sent by the network device is less than or equal to a first preset value, the number of resource for transmitting the target uplink control information is P; and/or, if the time interval between the time domain start position of the first resource among the resources used for transmitting the target uplink control information and the time domain end position of the downlink time unit sent by the network device is greater than the first preset value and less than or equal to a second preset value, the number of resource used for transmitting the target uplink control information is Q; and/or, if the time interval between the time domain start position of the first resource among the resources used for transmitting the target uplink control information and the time domain end position of the downlink time unit sent by the network device is greater than the second preset value, the number of resource used for transmitting uplink control information is Q. The value of P is less than or equal to Q, and the first preset value is less than the second preset value. By way of example without limitation, the first preset value is 16 microseconds, the second preset value is 25 microseconds, the value of P is 1, and the value of Q is 2.

The number of resource may also be determined according to a time interval between the first downlink time unit and the first uplink time unit. In an embodiment, the first downlink time unit is the last downlink time unit corresponding to the target uplink control information, and the first uplink time unit is the first time unit available for the terminal device to perform uplink transmission after the first downlink time unit.

As shown in FIG. 3, the uplink control information #1 includes HARQ-ACK information corresponding to PDSCH scheduled by the terminal device in a time unit included in a downlink transmission opportunity #1. Therefore, the first downlink time unit corresponding to the uplink control information #1 is the last downlink time unit in the downlink transmission opportunity #1, that is, the downlink time unit #1 in FIG. 1. After the downlink time unit #1, the first time unit that can be used for uplink transmission by the terminal device is the uplink time unit #1 shown in FIG. 1. The time interval #1 between the downlink time unit #1 and the uplink time unit #1 is greater than the preset value, so the resource for transmitting the uplink control information #1 includes two resources. In some embodiments, the two resources are located on the uplink time unit #1 and the latter one time unit of the uplink time unit #1.

The uplink control information #2 includes HARQ-ACK information corresponding to the PDSCH scheduled by the terminal device on the time unit included in the downlink transmission opportunity #2. Therefore, the first downlink time unit corresponding to the uplink control information #2 is the last downlink time unit in the downlink transmission opportunity #2, that is, the downlink time unit #2 in FIG. 1. After the downlink time unit #2, the first time unit available to the terminal device for uplink transmission is the uplink time unit #2 shown in FIG. 1. The time interval #2 between the downlink time unit #2 and the uplink time unit #2 is less than the preset value. Therefore, the resource used for transmitting the uplink control information #2 includes one resource. In some embodiments, the one resource is located on the uplink time unit #2.

It should be understood that, in the embodiments of the application, a time unit may refer to one or more subframes, or one or more time slots, or one or more micro time slots, or one or more symbols. The embodiments of the application are not limited thereto.

In the foregoing embodiments, the description of each embodiment has its own emphasis. For a part that is not described in detail in one embodiment, reference may be made to related descriptions in other embodiments.

Based on the above introduction, it can be seen that when the solution described in the embodiments of the application is used, when a high-priority channel access mode is used, the terminal device can be configured with fewer resources for transmitting target uplink control information; and when a low-priority channel access mode is used, the terminal device can be configured with a larger number of resource for transmitting the target uplink control information, so that the transmission opportunity of the target uplink control information can be ensured while reducing the waste of resources. Therefore, the transmission success rate of the target uplink control information is improved, and the system performance is improved.

In addition, the resource allocation method described in the embodiments of the application is widely applicable and can also be applied to other uplink information transmission, such as PRACH (Physical Random Access Channel), PUSCH (Physical Uplink Shared Channel), and the like.

It should be noted that, under the premise of no conflict, the embodiments described in this application and/or the technical features in each embodiment can be arbitrarily combined with each other, and the technical solution obtained after the combination should also fall into the protection scope of this application.

It should be understood that, in the various embodiments of the application, the size of the sequence numbers of the above processes does not mean the order of execution. The execution order of each process should be determined by its function and internal logic, and should not constitute any limitation on implementation manner of the embodiments of the application.

The above is the description of the method embodiments. The device embodiments are used to further describe the solutions described in this application.

Figure 4:
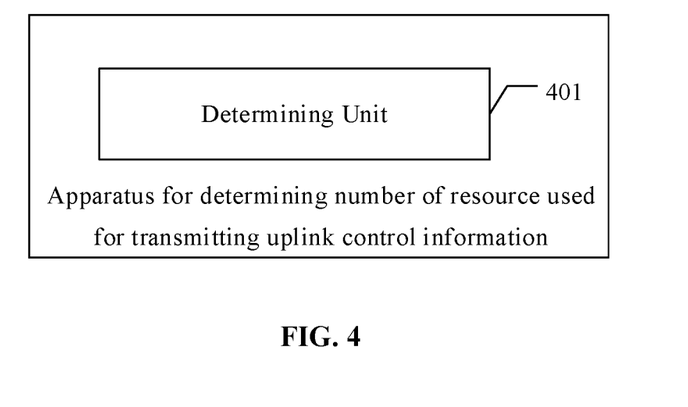
FIG. 4 is a block diagram illustrating an apparatus for determining number of uplink control information transmission resource according to a first embodiment of the application.

FIG. 4 is a block diagram of an apparatus for determining the number of uplink control information transmission resource according to a first embodiment of the application. As shown in FIG. 4, the apparatus includes a determining unit 401.

The determining unit 401 is configured to determine target uplink control information.

The determining unit 401 is further configured to determine the number of resource used for transmitting target uplink control information according to a preset rule or indication information sent by a network device.

The number of resource may be determined according to a target channel access mode, which is a channel access mode corresponding to the resource used for transmitting target uplink control information. In some embodiments, the target channel access mode may be a channel access mode corresponding to the first resource used for transmitting the target uplink control information.

When the target channel access mode is the first channel access mode, the number of resource is N, and when the target channel access mode is the second channel access mode, the number of resource is M, and the priority of the first channel access mode is higher than the priority of the second channel access mode. M and N are positive integers, and the value of M is greater than or equal to the value of N.

The value of M is preset or determined according to the indication information sent by the network device, and/or, the value of N is preset or determined according to the indication information sent by the network device.

The target channel access mode may also correspond to a target parameter set, and the number of resource is determined according to the target parameter set. When the target channel access mode is the first channel access mode, the target parameter set is the first parameter set. When the target channel access mode is the second channel access mode, the target parameter set is the second parameter set. The priority of the first channel access mode is higher than the priority of the second channel access mode. The maximum value in the first parameter set is less than the maximum value in the second parameter set.

The first parameter set is preset or determined according to the indication information sent by the network device, and/or the second parameter set is preset or determined according to the indication information sent by the network device.

The determining unit 401 may determine the number of resource from the target parameter set according to the indication information sent by the network device.

The priority of the first channel access mode being higher than the priority of the second channel access mode may include following examples. The first channel access mode is no channel detection, and the second channel access mode is a single channel detection. Alternatively, the first channel access mode is no channel detection, and the second channel access mode is channel detection based on the contention window. Alternatively, the first channel access mode is single channel detection, and the second channel access mode is channel detection based on the contention window. Alternatively, the first channel access mode is the channel access mode with higher priority in the channel detection based on the contention window, and the second channel access mode is the channel access mode with lower priority in the channel detection based on the contention window.

The number of resource may also be determined according to a time domain position and/or a frequency domain position of the resource used for transmitting target uplink control information. In some embodiments, the number of resource may be determined according to a time domain position and/or a frequency domain position of the first one resource among resources for transmitting target uplink control information.

The number of resource may also be determined according to a time interval between a first downlink time unit and a first uplink time unit. In an embodiment, the first downlink time unit is the last downlink time unit corresponding to the target uplink control information, and the first uplink time unit is the first time unit available for the terminal device to perform uplink transmission after the first downlink time unit.

In this embodiment, the resources used for transmitting the target uplink control information may include at least one of a PUCCH resource and a PUSCH resource. The target uplink control information may include at least one of HARQ-ACK information, CSI information, and scheduling request SR information.

Figure 5:
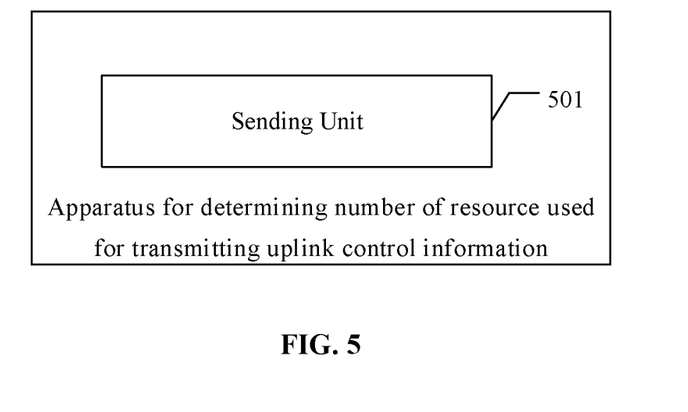
FIG. 5 is a block diagram illustrating an apparatus for determining number of uplink control information transmission resource according to a second embodiment of the application.

FIG. 5 is a block diagram illustrating an apparatus for determining the number of uplink control information transmission resource according to a second embodiment of the application. As shown in FIG. 5, it includes a sending unit 501.

The sending unit 501 is configured to send indication information to a terminal device, the indication information being used by the terminal device for determining the number of resource used for transmitting target uplink control information.

The number of resource may be determined according to a target channel access mode, and the target channel access mode is a channel access mode corresponding to the resource used for transmitting the target uplink control information. In some embodiments, the target channel access mode may be a channel access mode corresponding to a first one resource used for transmitting the target uplink control information.

When the target channel access mode is a first channel access mode, the number of resource is N; and when the target channel access mode is a second channel access mode, the number of resource is M; wherein a priority of the first channel access mode is higher than a priority of the second channel access mode, where M and N are positive integers, and a value of M is greater than or equal to a value of N.

The sending unit 501 may send the indication information to the terminal device, and the indication information is used by the terminal device for determining the value of M, and/or, the sending unit 501 may send indication information to the terminal device, and the indication information is used by the terminal device for determining the value of N.

The target channel access mode may also correspond to a target parameter set, and the number of resource is determined according to the target parameter set. When the target channel access mode is a first channel access mode, the target parameter set is a first parameter set; and when the target channel access mode is a second channel access mode, the target parameter set is a second parameter sets; wherein a priority of the first channel access mode is higher than a priority of the second channel access mode, and a maximum value in the first parameter set is smaller than a maximum value in the second parameter set.

The sending unit 501 may send the indication information to the terminal device, and the indication information is used by the terminal device for determining the first parameter set, and/or, the sending unit 501 may send indication information to the terminal device, and the indication information is used by the terminal device for determining the second parameter set.

The sending unit 501 may also send the indication information to the terminal device, and the indication information is used by the terminal device for determining the number of resource from the target parameter set.

The priority of the first channel access mode being higher than the priority of the second channel access mode may include following examples. The first channel access mode is no channel detection, and the second channel access mode is a single channel detection. Alternatively, the first channel access mode is no channel detection, and the second channel access mode is channel detection based on the contention window. Alternatively, the first channel access mode is single channel detection, and the second channel access mode is channel detection based on the contention window. Alternatively, the first channel access mode is the channel access mode with higher priority in the channel detection based on the contention window, and the second channel access mode is the channel access mode with lower priority in the channel detection based on the contention window.

The number of resource may also be determined according to a time domain position and/or a frequency domain position of the resource used for transmitting target uplink control information. In some embodiments, the number of resource may be determined according to a time domain position and/or a frequency domain position of the first one resource among resources for transmitting target uplink control information.

The number of resource may also be determined according to a time interval between a first downlink time unit and a first uplink time unit. In an embodiment, the first downlink time unit is the last downlink time unit corresponding to the target uplink control information, and the first uplink time unit is the first time unit available for the terminal device to perform uplink transmission after the first downlink time unit.

In this embodiment, the resources used for transmitting the target uplink control information may include at least one of a PUCCH resource and a PUSCH resource. The target uplink control information may include at least one of HARQ-ACK information, CSI information, and scheduling request SR information.

For specific working processes of the apparatus embodiments shown in FIG. 4 and FIG. 5, related descriptions in the foregoing method embodiments may be referred to, and details are not repeated herein.

Figure 6:
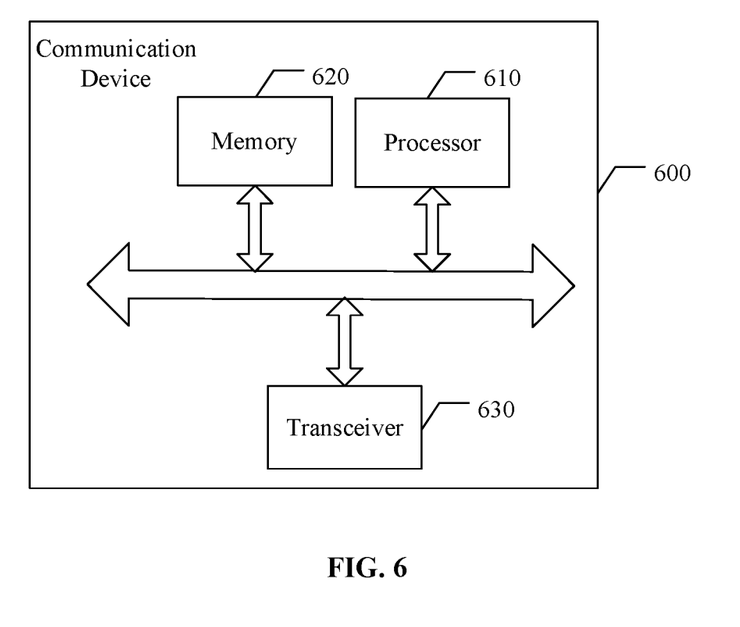
FIG. 6 is a block diagram illustrating a communication device 600 according to an embodiment of the application.

FIG. 6 is a block diagram illustrating a communication device 600 according to an embodiment of the present application. The communication device 600 shown in FIG. 6 includes a processor 610, which can call and run a computer program from a memory 620 to implement the method in the embodiments of the application.

In some embodiments, as shown in FIG. 6, the communication device 600 may further include a memory 620. The processor 610 may call and run the computer program from the memory 620 to implement the method in the embodiments of the application.

The memory 620 may be a separate device independent of the processor 610, or may be integrated in the processor 610.

In some embodiments, as shown in FIG. 6, the communication device 600 may further include a transceiver 630, and the processor 610 may control the transceiver 630 to communicate with other devices. Specifically, it may send information or data to other devices, or receive other information, data sent by the device.

The transceiver 630 may include a transmitter and a receiver. The transceiver 630 may further include antennas, and the number of antennas may be one or more.

In some embodiments, the communication device 600 may be a network device according to an embodiment of the application, and the communication device 600 may implement a corresponding process implemented by the network device in each method according to the embodiments of the application, which will not be repeated here for the sake of brevity.

In some embodiments, the communication device 600 may be a mobile terminal/a terminal device according to an embodiment of the application, and the communication device 600 may implement a corresponding process implemented by the mobile terminal/the terminal device in each method according to the embodiments of the application, which will not be repeated here for the sake of brevity.

Figure 7:
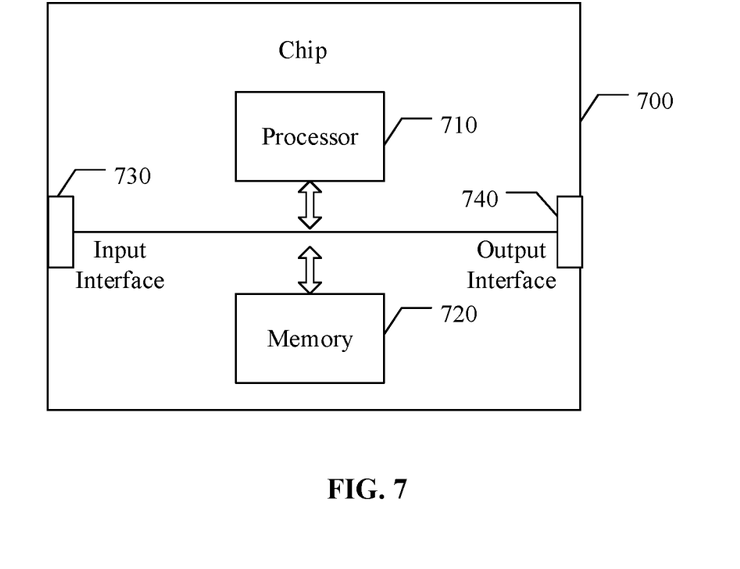
FIG. 7 is a block diagram illustrating a chip according to an embodiment of the application.

FIG. 7 is a block diagram illustrating a chip according to an embodiment of the application. The chip 700 shown in FIG. 7 includes a processor 710, and the processor 710 can call and run a computer program from a memory to implement the method in the embodiments of the application.

In some embodiments, as shown in FIG. 7, the chip 700 may further include a memory 720. The processor 710 may call and run the computer program from the memory 720 to implement the method in the embodiments of the application.

The memory 720 may be a separate device independent of the processor 710, or may be integrated in the processor 710.

In some embodiments, the chip 700 may further include an input interface 730. The processor 710 may control the input interface 730 to communicate with other devices or chips. Specifically, the processor 710 may obtain information or data sent by other devices or chips.

In some embodiments, the chip 700 may further include an output interface 740. The processor 710 may control the output interface 740 to communicate with other devices or chips. Specifically, the processor 710 may output information or data to the other devices or chips.

In some embodiments, the chip can be applied to the network device according to the embodiments of the application, and the chip can implement the corresponding process implemented by the network device in the method according to the embodiments of the application. For brevity, details are not described herein.

In some embodiments, the chip can be applied to the mobile terminal/the terminal device according to the embodiments of the application, and the chip can implement the corresponding process implemented by the mobile terminal/the terminal device in the method according to the embodiments of the application. For brevity, details are not described herein.

It should be understood that the chip mentioned in the embodiments of the application may also be referred to as a system-level chip, a system chip, a chip system or a system-on-chip.

Figure 8:
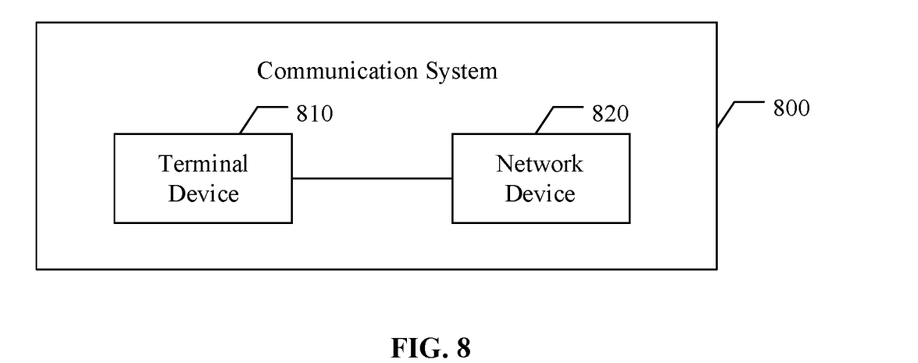
FIG. 8 is a block diagram illustrating a communication system 800 according to an embodiment of the application.

FIG. 8 is a block diagram illustrating a communication system 800 according to an embodiment of the application. As shown in FIG. 8, the communication system 800 includes a terminal device 810 and a network device 820.

The terminal device 810 may be configured to implement the corresponding functions implemented by the terminal device in the foregoing methods, and the network device 820 may be configured to implement the corresponding functions implemented by the network device in the foregoing methods. Detailed description will be not repeated here for brevity.

It should be understood that the processor in the embodiment of the application may be an integrated circuit chip and has a signal processing capability. In the implementation process, each step of the foregoing method embodiment may be completed by using an integrated logic circuit of hardware in a processor or an instruction in a form of software. The above-mentioned processor may be a general-purpose processor, a digital signal processor (DSP), an application specific integrated circuit (ASIC), a field programmable gate array (FPGA), or other programming logic devices, discrete gate or transistor logic devices, discrete hardware components, which can implement or execute various methods, steps, and logical block diagrams disclosed in the embodiments of the application. The general-purpose processor may be a microprocessor or the processor may be any conventional processor or the like. The steps of the method disclosed in combination with the embodiments of the application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in a memory, and the processor reads the information in the memory and completes the steps of the foregoing method in combination with its hardware.

It should be understood that the memory mentioned in the embodiments of the application may be a volatile memory or a non-volatile memory, or may include both volatile and non-volatile memory. In an embodiment, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache. By way of example but not limitation, many forms of RAM are available, such as a static random access memory (static RAM, SRAM), a dynamic random access memory (dynamic RAM, DRAM), synchronous dynamic random access memory (SDRAM), double data rate synchronous dynamic random access memory (Double SDRAM, DDR SDRAM), enhanced synchronous dynamic random access memory (enhanced SDRAM, ESDRAM), synchronous connection Dynamic random access memory (synch link DRAM, SLDRAM), direct memory bus random access memory (Direct Rambus RAM, DR RAM) and so on. It should be noted that the memory of the systems and methods described herein is intended to include, but is not limited to, these and any other suitable types of memory.

A computer-readable storage medium is also provided in the embodiments of the application for storing a computer program.

In some embodiments, the computer-readable storage medium may be applied to the network device in the embodiment of the application, and the computer program causes the computer to execute the corresponding process implemented by the network device in each method in the embodiments of the application. For the sake of brevity, details will not be repeated here.

In some embodiments, the computer-readable storage medium may be applied to the mobile terminal/terminal device in the embodiments of the application, and the computer program causes the computer to execute a corresponding process implemented by the mobile terminal/ terminal device in each method in the embodiments of the application. For the sake of brevity, details will not be repeated here.

A computer program product is also provided in the embodiments of the application, including computer program instructions.

In some embodiments, the computer program product can be applied to the network device in the embodiments of the application, and the computer program instruction causes the computer to execute a corresponding process implemented by the network device in each method in the embodiments of the application. For the sake of brevity, details will not be repeated here.

In some embodiments, the computer program product can be applied to a mobile terminal/terminal device in the embodiments of the application, and the computer program instructions cause the computer to execute a corresponding process implemented by the mobile terminal/terminal device in each method in the embodiments of the application. For the sake of brevity, details will not be repeated here.

A computer program is also provided in the embodiments of the application.

In some embodiments, the computer program may be applied to a network device in the embodiments of the application. When the computer program is run on a computer, the computer is caused to execute a corresponding process implemented by the network device in each method in the embodiments of the application. For the sake of brevity, details will not be repeated here.

In some embodiments, the computer program may be applied to a mobile terminal/terminal device in the embodiments of the application. When the computer program is run on a computer, the computer is caused to execute a corresponding process implemented by the mobile terminal/terminal device in each method in the embodiments of the application. For the sake of brevity, details will not be repeated here.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the apparatus embodiments described above are only for exemplary. For example, the division of units in the embodiments described above is only a logical function division. In actual implementation, there may be another division manner. For example, multiple units or components may be combined or integrated to another system, or some features can be ignored or not implemented. In addition, the displayed or discussed mutual coupling or direct coupling or communication connection may be indirect coupling or communication connection through some interfaces, devices or units, which may be electrical, mechanical or in other forms.

The above-mentioned units described as separate components may be or may not be physically separated, that is, they may be located in one place, or may be distributed on multiple network units. Some or all of the units can be selected according to actual needs to achieve the objectives of the embodiments of the application.

In addition, each functional unit in each embodiment of the application may be integrated into one processing unit, or each of the units may exist separately physically, or two or more units may be integrated into one unit.

If the functions are implemented in the form of software functional units and sold or used as an independent product, they can be stored in a computer-readable storage medium. Based on this understanding, an essential part of the technical solution of this application or, in other words, a part thereof that contributes to existing technology, or other parts of the technical solution can be embodied in the form of a software product. The computer software product is stored in a storage medium, including several instructions used for causing a computer device (which may be a personal computer, a server, or a network device, and the like) to perform all or part of the steps of the method described in the embodiments of the application. The foregoing storage medium includes various medium that can store program codes, such as a U disk, a mobile hard disk, a ROM, a RAM, a magnetic disk, or an optical disk.

The above content is only a specific implementation of the embodiments of the application, without limiting the protection scope of the embodiments of the application. Any modification or replacement conceived by those skilled in the art within the technical scope disclosed in the embodiments of the application should be covered within the protection scope of the embodiments of the application. Therefore, the protection scope of the embodiments of the application shall be subject to the protection scope of the claims.

What is claimed is:

1. A terminal device, comprising a processor and a memory, wherein the memory is configured to store instructions executable by the processor, and the processor, when executing the instructions, is configured to:
   determine target uplink control information; and
   determine, according to a preset rule or according to indication information sent by a network device, a number of resource used for transmitting the target uplink control information,
   wherein the number of resource is determined according to a target channel access mode, and the target channel access mode is a channel access mode corresponding to the resource used for transmitting the target uplink control information, and wherein
   when the target channel access mode is a first channel access mode, the number of resource is N; and when the target channel access mode is a second channel access mode, the number of resource is M; wherein a priority of the first channel access mode is higher than a priority of the second channel access mode, where M and N are positive integers, and a value of M is greater than or equal to a value of N; or
   the target channel access mode corresponds to a target parameter set, and the number of resource is determined according to the target parameter set, wherein, when the target channel access mode is a first channel access mode, the target parameter set is a first parameter set and when the target channel access mode is a second channel access mode, the target parameter set is a second parameter sets; wherein a priority of the first channel access mode is higher than a priority of the second channel access mode, and a maximum value in the first parameter set is smaller than a maximum value in the second parameter set.

2. The terminal device according to claim 1, wherein the target channel access mode is a channel access mode corresponding to a first one resource used for transmitting the target uplink control information.

3. The terminal device according to claim 1, wherein at least one of the value of M or the value of N is preset or determined according to the indication information sent by the network device.

4. The terminal device according to claim 1, wherein at least one of the first parameter set or the second parameter set is preset or is determined according to the indication information sent by the network device.

5. The terminal device according to claim 1, wherein the processor is further configured to determine, according to the indication information sent by the network device, the number of resource from the target parameter set.

6. The terminal device according to claim 1, wherein the priority of the first channel access mode is higher than the priority of the second channel access mode comprises:
the first channel access mode is no channel detection, and the second channel access mode is a single channel detection; or,
the first channel access mode is no channel detection, and the second channel access mode is channel detection based on a contention window; or,
the first channel access mode is a single channel detection, and the second channel access mode is a channel detection based on a contention window; or,
the first channel access mode is a channel access mode with a higher priority in a channel detection based on a contention window, and the second channel access mode is a channel access mode with a lower priority in the channel detection based on the contention window.

7. The terminal device according to claim 1, wherein the target uplink control information comprises at least one of hybrid automatic repeat request-acknowledgement (HARQ-ACK) information, channel state information (CSI), or scheduling request (SR) information.

8. A network device, comprising a processor and a memory, wherein the memory is configured to store instructions executable by the processor, and the processor, when executing the instructions, is configured to:
send, through a transceiver, indication information to a terminal device, the indication information being used by the terminal device for determining the number of resource used for transmitting target uplink control information,
wherein the number of resource is determined according to a target channel access mode, and the target channel access mode is a channel access mode corresponding to the resource used for transmitting the target uplink control information, and wherein
when the target channel access mode is a first channel access mode, the number of resource is N; and when the target channel access mode is a second channel access mode, the number of resource is M; wherein a priority of the first channel access mode is higher than a priority of the second channel access mode, where M and N are positive integers, and a value of M is greater than or equal to a value of N; or
the target channel access mode corresponds to a target parameter set, and the number of resource is determined according to the target parameter set, wherein, when the target channel access mode is a first channel access mode, the target parameter set is a first parameter set and when the target channel access mode is a second channel access mode, the target parameter set is a second parameter sets; wherein a priority of the first channel access mode is higher than a priority of the second channel access mode, and a maximum value in the first parameter set is smaller than a maximum value in the second parameter set.

9. The network device according to claim 8, wherein the target channel access mode is a channel access mode corresponding to a first one resource used for transmitting the target uplink control information.

10. The network device according to claim 8, wherein the processor is further configured to:
send, through the transceiver, the indication information to the terminal device, the indication information being used by the terminal device for determining at least one of the value of M or the value of N.

11. The network device according to claim 8, wherein the resource used for transmitting the target uplink control information comprises at least one of a physical uplink control channel (PUCCH) resource or a physical uplink shared channel (PUSCH) resource.

12. A network device, comprising a processor and a memory, wherein the memory is configured to store instructions executable by the processor, and the processor, when executing the instructions, is configured to:
send, through a transceiver, indication information to a terminal device, the indication information being used by the terminal device for determining the number of resource used for transmitting target uplink control information, wherein the number of resource is determined according to a time interval between a first downlink time unit and a first uplink time unit, wherein the first downlink time unit is a last one downlink time unit corresponding to the target uplink control information, and the first uplink time unit is a first one time unit available for the terminal device to perform uplink transmission after the first downlink time unit.

* * * * *